United States Patent
Wannenmacher

(10) Patent No.: US 6,462,523 B1
(45) Date of Patent: Oct. 8, 2002

(54) LOAD-SYNCHRONOUS DOPPLER CHARGE PUMP WITH AN INTEGRATED SERIES-PATH REGULATOR

(75) Inventor: Volker Wannenmacher, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/937,142

(22) PCT Filed: Mar. 1, 2000

(86) PCT No.: PCT/DE00/00609

§ 371 (c)(1),
(2), (4) Date: Sep. 21, 2000

(87) PCT Pub. No.: WO00/57567

PCT Pub. Date: Sep. 28, 2000

(30) Foreign Application Priority Data

Mar. 23, 1999 (DE) .......................... 199 13 082

(51) Int. Cl.[7] .......................... H02M 7/00; H02M 7/19; H02M 7/25
(52) U.S. Cl. .......................... 323/282; 323/222; 363/60
(58) Field of Search .................. 363/59, 60; 323/222, 323/282, 284

(56) References Cited

U.S. PATENT DOCUMENTS

| 4,733,159 A | * | 3/1988 | Edwards et al. ............. 323/282 |
| 5,423,866 A | * | 6/1995 | Ekwall ......................... 607/11 |
| 5,774,348 A | * | 6/1998 | Druce et al. ................... 363/60 |
| 5,939,866 A | * | 8/1999 | Bjorkengren ................ 323/266 |

FOREIGN PATENT DOCUMENTS

| EP | 0 561 257 A1 | 9/1993 |
| EP | 0 654 911 A2 | 5/1995 |
| GB | 2 310 570 A | 8/1997 |

* cited by examiner

Primary Examiner—Bao Q. Vu
(74) Attorney, Agent, or Firm—Morrison & Foerster, LLP

(57) ABSTRACT

Load-synchronous Doppler charge pump with an integrated series-path regulator A circuit for voltage raising for pulsed-operated loads is proposed. A capacitor CH is driven by a switching unit (2, S1) such that it is charged by a battery (1) during the time in which the load (4) is not in operation, and its voltage is added to the voltage from the battery (1) during operation of the load (4). The switching unit has a transistor (2) whose resistance during operation of the load (4) is varied by a control circuit (3) such that the output voltage of the circuit for voltage raising corresponds essentially to a nominal value, which is supplied to the control circuit (3) and/or is integrated in the control circuit (3).

6 Claims, 2 Drawing Sheets

LOAD-SYNCHRONOUS DOPPLER CHARGE PUMP WITH AN INTEGRATED SERIES-PATH REGULATOR

This application claims priority to International Application No PCT/DE00/00609 which was published in the German language on Mar. 23, 1999.

TECHNICAL FIELD OF THE INVENTION

The present invention relates to a load-synchronous Doppler charge pump with an integrated series-path regulator, and in particular, to a circuit for voltage raising for pulsed-operated loads.

BACKGROUND OF THE INVENTION

A circuit is known, for example, from EP-A-0561257, and is illustrated in FIG. 4. Circuits for voltage raising are required, for example, for TDMA mobile radios, in which there are a number of time channels in one frequency band. Timeslots are used for transmission, as a result of which a relatively high battery current flows during the short transmission bursts, and leads to voltage drops in the battery and supply lines which are so high that the critical supply voltage for the integrated circuits or voltage regulators can be undershot, particularly at the end of the battery discharge time.

In the circuit illustrated in FIG. 4 for voltage raising, a battery voltage $U_B$ of, for example, 6 volts is provided. Voltage is possible via a switch S with two changeover contacts, and provides the supply voltage for the transmission output stage of a mobile radio, and the critical supply voltage for integrated circuits. To prevent the last-mentioned supply voltage for the voltage-critical circuit parts from falling below a critical value, a voltage raiser is arranged in this path. This voltage raiser contains a capacitor C and a charging resistor R index L. The capacitor is charged when no transmissions are being made. During the transmission bursts which are transmitted in the transmission output stage, the voltage of the capacitor C in the supply path to the voltage-critical circuit parts is added to the battery voltage. The voltage raiser is followed by a regulator for, for example, 5 volts, whose output voltage is supplied to the downstream circuit parts for control purposes. The switched voltage raiser as shown in FIG. 4 ensures that the input voltage to the 5-volt voltage regulator for control purposes always remains above 5 volts, even when the battery voltage $U_B$ falls well below 5 volts due to the internal resistance of the battery.

The circuit in FIG. 4 can thus be represented, in simplified form, as in FIG. 3. That is, it may be represented as a combination of a charge pump 5 followed by a linear regulator 7. The output voltage is compared with a nominal value in the linear regulator 7. Such a linear regulator 7, which follows the charge pump 5, can thus stabilize the output voltage.

SUMMARY OF THE INVENTION

In one embodiment of the invention, there is a circuit for voltage raising for pulsed-operated loads. The circuit includes, for example, a capacitor, a switching unit with a controllable transistor, and a control circuit, wherein the capacitor is driven by the switching unit such that it is charged by a battery during the time in which the load is not in operation, and a voltage is added to the voltage from the battery during operation of the load, the output voltage of the circuit is regulated by the control circuit during operation of the load for voltage raising such that it corresponds to a nominal value, and the control circuit varies the resistance of the transistor in order to regulate the output voltage.

In another aspect of the invention, the transistor is connected in parallel with the capacitor.

In another aspect of the invention, the switching unit also has a make-contact switch connected in series with the transistor.

In yet another aspect of the invention, when the load is not in operation, the transistor is switched off.

In another aspect of the invention, the transistor and the control circuit are part of an integrated circuit.

In another embodiment of the invention, there is a mobile radio. The mobile radio includes, for example, a circuit for voltage raising including a capacitor, a switching unit with a controllable transistor, and a control circuit, wherein the capacitor is driven by the switching unit such that it is charged by a battery during the time in which the load is not in operation, and a voltage is added to the voltage from the battery during operation of the load, the output voltage of the circuit is regulated by the control circuit during operation of the load for voltage raising such that it corresponds to a nominal value, and the control circuit varies the resistance of the transistor in order to regulate the output voltage.

BRIEF DESCRIPTION OF THE DRAWINGS

An exemplary embodiment of the invention will now be described in the following text with reference to the figures of the accompanying drawings, so that further features, advantages and characteristics of a circuit according to the present invention are disclosed.

DETAILED DESCRIPTION OF THE PREFERRED EMBODIMENTS

The present invention provides a technique which allows the voltage regulation function in a voltage raising circuit (charge pump) to be physically simplified.

According to the invention, a circuit is provided for voltage raising for pulsed-operated loads such as mobile radios. Such a circuit is often also referred to as a "load-synchronous Doppler charge pump". In this case, a capacitor is provided, which is driven by a switching unit such that it is charged by a battery during the time in which the load is not in operation. The voltage is added to the voltage from the battery during operation of the load. The switching unit in this case has a transistor whose resistance during operation of the load can be varied by a control circuit such that the output voltage of the circuit for voltage raising corresponds essentially to a nominal value.

The transistor can be connected in parallel with the capacitor. The switching unit may also have a make-contact switch connected in series with the transistor. When the load is not in operation, the transistor can be switched off. The transistor and the control circuit may advantageously be part of an integrated circuit.

Furthermore, according to the present invention, a mobile radio such as a mobile telephone is provided, which has a circuit for voltage raising as described above.

The invention discloses a load-synchronous Doppler charge pump which allows a pulsed-operated load to be supplied in a relatively simple manner. A downstream linear regulator, which reduces the voltage to the required load voltage of, for example, 5 volts, is provided in order to solve the voltage regulation problem.

As already stated in the introduction, a load-synchronous Doppler charge pump has already been proposed, which allows a pulsed-operated load to be supplied in a relatively simple manner. A downstream linear regulator, which reduces the voltage to the required load voltage of, for example, 5 volts, is provided in order to solve the voltage regulation problem.

Figure 2:
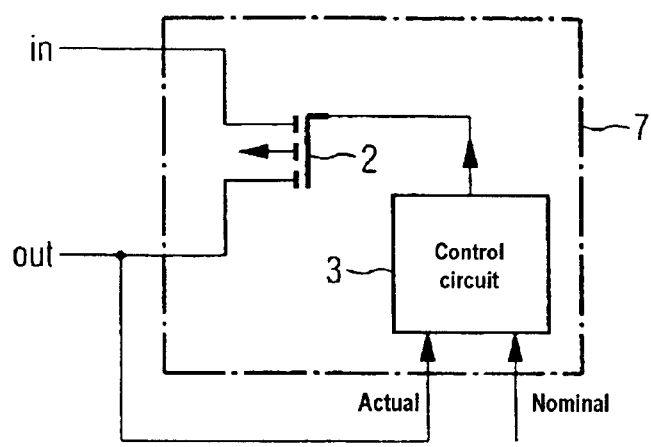
FIG. 2 shows, a simplified illustration of the circuit shown in FIG. 1.
Figure 3:
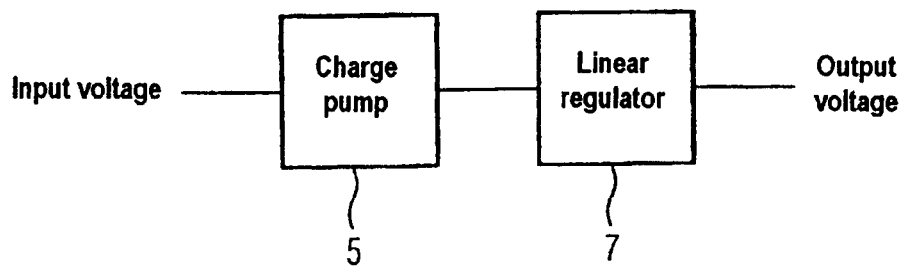
FIG. 3 shows, schematically, a combination of a charge pump with a linear regulator.

FIG. 2 shows the internal design of a linear regulator 7. This linear regulator 7 reduces the voltage to the required load voltage, and in which a transistor 2 is operated as a variable resistor. The output voltage is compared with a nominal value in the control circuit 3 of the linear regulator 7, and the transistor 2 is operated as a variable resistor, as a function of this. The nominal value preset for the control circuit 3 may be in integrated form, and need not be connected to the exterior as a pin connection.

Figure 1:
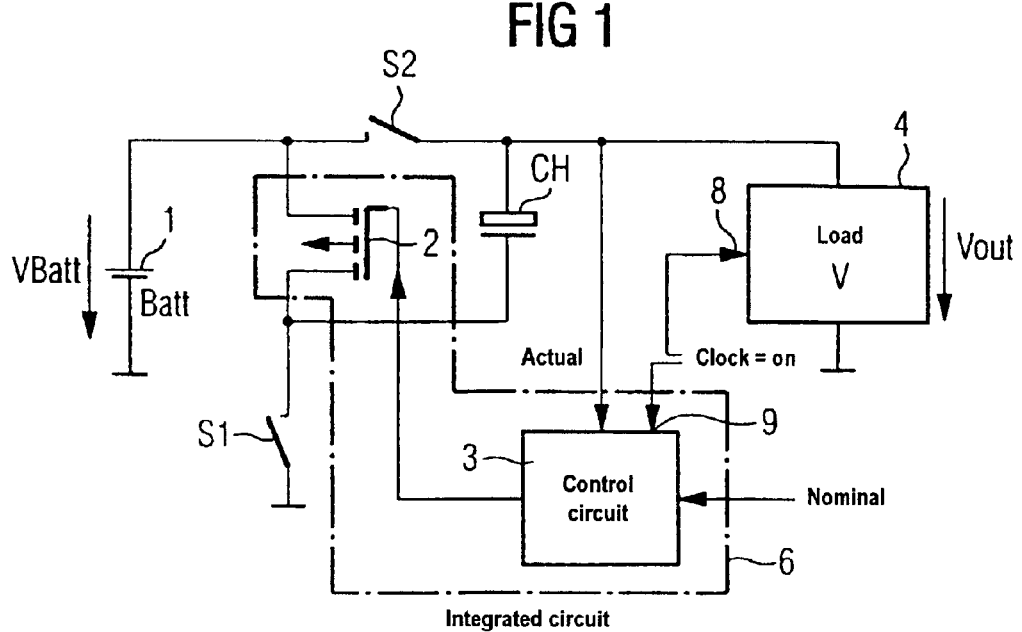
FIG. 1 shows a load-synchronous charge pump according to the invention, with integrated series-path regulation.

FIG. 1 will now be used for reference to explain how, according to the invention, the combination of a charge pump and a linear regulator can be combined while achieving a physical simplification. As can be seen in FIG. 1, the transistor 2, which can be operated as a variable resistor when it is switched on, is connected in parallel with the capacitor CH. The transistor 2 is in this case driven by a control circuit 3. The control circuit 3 produces an output signal, namely the drive signal for the transistor 2, as a function of a comparison of a nominal value with the actual value of the input voltage of a load 4. The input voltage for the load 4, and hence the output voltage $V_{out}$ from the circuit for voltage raising, are intended to be kept as constant as possible, and are intended to correspond to the nominal value. As is likewise indicated in FIG. 1, the control circuit 3 and the transistor 2 could be part of an integrated circuit 6.

When the load 4 is not being operated, the switch S2 and the switch S1 are each closed, so that the capacitor CH is charged by the voltage from the battery 1. In this situation, the control circuit 3 switches the transistor 2 off.

During the phase when the load 4 is being operated, the switch S2 and the switch S1 are opened, so that the voltage across the capacitor CH is added to the battery voltage $V_{Bat}$ of the battery 1. In this phase when the load 4 is in operation, the control circuit 3 drives the transistor 2 as a variable resistor, in such a manner that the difference between the actual value of the output voltage $V_{out}$ and the predetermined nominal or reference value is as small as possible.

Figure 4:
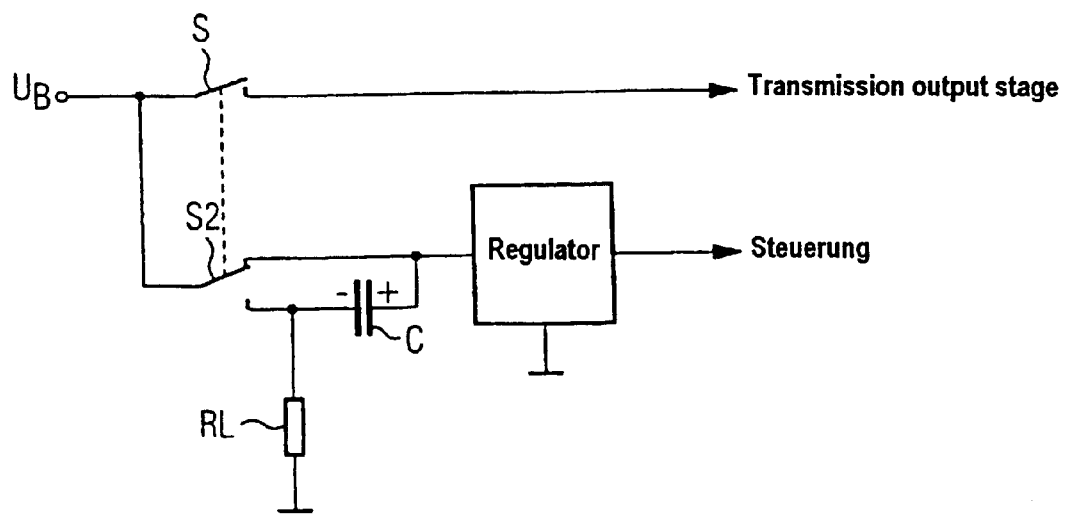
FIG. 4 shows a circuit according to the invention for voltage raising for pulsed-operated loads.

Thus, the linear regulator according to the present invention partially carries out the function of the second switch S2 in FIG. 4. This changeover switch S2 in FIG. 4 is, so to speak, replaced by the make-contact switch S1 and the transistor 2 as a variable resistor.

During the period when the load 4 is switched on, the actual value and nominal value of the output voltage $V_{out}$ are compared in the control circuit 3, and the transistor 2 is readjusted as appropriate by the control circuit 3. When the load 4 is switched off, the transistor 2 is switched off by the control circuit 3. To do this, the control circuit 3 is supplied with a signal corresponding to the operating clock of the load 4, in order to ensure that the charge pump operates in synchronism with the load. This clock signal is supplied to an input 8 of the load 4, and to an input 9 of the control circuit 3.

The advantage of the circuit as claimed in the present invention, is that no additional transistor or variable resistor is required to provide the linear regulator function. In contrast to normal linear readjustment, the switching unit of the charge pump, which has the make-contact switch S1 and the transistor S2 is used as a variable resistor, thus providing voltage regulation when the load 4 is switched on. The linear regulator is thus not positioned downstream from the charge pump as a separate component but is, in fact, included in the charge pump circuit. As already stated, the control circuit 3 and the transistor 2 may be in the form of an integrated circuit 6. stated, the control circuit 3 and the transistor 2 may be in the form of an integrated circuit 6.

What is claimed is:

1. A mobile radio, comprising:
   a circuit for voltage raising including a capacitor;
   a switching unit with a controllable transistor; and
   a control circuit, wherein
   the capacitor is driven by the switching unit such that it is charged by a battery during the time in which the load is not in operation, and a voltage is added to the voltage from the battery during operation of the load, the output voltage of the circuit is regulated by the control circuit during operation of the load for voltage raising such that it corresponds to a nominal value, and
   the control circuit varies the resistance of the transistor in order to regulate the output voltage.

2. A circuit for voltage raising for pulsed-operated loads, comprising:
   a capacitor;
   a switching unit with a controllable transistor; and
   a control circuit, wherein
   the capacitor is driven by the switching unit such that it is charged by a battery during the time in which the load is not in operation, and a voltage is added to the voltage from the battery during operation of the load, the output voltage of the circuit is regulated by the control circuit during operation of the load for voltage raising such that it corresponds to a nominal value, and the control circuit varies the resistance of the transistor in order to regulate the output voltage.

3. The circuit as claimed in claim 2, wherein the transistor is connected in parallel with the capacitor.

4. The circuit as claimed in claim 2, wherein the switching unit also has a make-contact switch connected in series with the transistor.

5. The circuit as claimed in claim 2, wherein when the load is not in operation, the transistor is switched off.

6. The circuit as claimed in claim 2, wherein the transistor and the control circuit are part of an integrated circuit.

* * * * *